United States Patent
McGrath et al.

(10) Patent No.: US 9,742,838 B2
(45) Date of Patent: Aug. 22, 2017

(54) LOCKED FILES FOR CARTRIDGES IN A MULTI-TENANT PLATFORM-AS-A-SERVICE (PAAS) SYSTEM

(71) Applicant: Red Hat, Inc., Raleigh, NC (US)

(72) Inventors: Michael McGrath, Schaumburg, IL (US); Jhon Honce, Cave Creek, AZ (US)

(73) Assignee: Red Hat, Inc., Raleigh, NC (US)

( * ) Notice: Subject to any disclaimer, the term of this patent is extended or adjusted under 35 U.S.C. 154(b) by 270 days.

(21) Appl. No.: 14/183,835

(22) Filed: Feb. 19, 2014

(65) Prior Publication Data
US 2015/0193452 A1 Jul. 9, 2015

Related U.S. Application Data

(60) Provisional application No. 61/925,381, filed on Jan. 9, 2014.

(51) Int. Cl.
*G06F 17/30* (2006.01)
*H04L 29/08* (2006.01)
(Continued)

(52) U.S. Cl.
CPC .......... *H04L 67/10* (2013.01); *G06F 9/45558* (2013.01); *G06F 9/541* (2013.01);
(Continued)

(58) Field of Classification Search
CPC ......... G06F 17/30082; G06F 17/30174; G06F 17/30194; G06F 17/30309;
(Continued)

(56) References Cited

U.S. PATENT DOCUMENTS 6,216,258 B1 4/2001 Mohan
9,063,746 B2 6/2015 Yousouf
(Continued)

OTHER PUBLICATIONS

USPTO, Notice of Allowance for U.S. Appl. No. 14/188,772, mailed Sep. 23, 2015.
(Continued)

*Primary Examiner* — Shiow-Jy Fan
(74) *Attorney, Agent, or Firm* — Lowenstein Sandler LLP

(57) ABSTRACT

Implementations for locked files for cartridges in a multi-tenant Platform-as-a-Service (PaaS) system are disclosed. A method of the disclosure includes identifying, by a processing device of a multi-tenant Platform-a-a-Service (PaaS) system, an operation requested to be performed by the multi-tenant PaaS system, determining access contexts for the identified operation with respect to a cartridge associated with the operation, the access context comprising a user or component that is attempting to access a file of the cartridge for the identified operation, accessing a locked files manifest of the cartridge, the locked files manifest identifying at least one of files or directories of the cartridge to which a cartridge author of the cartridge restricts access to application developers utilizing the cartridge to execute an application, and applying access permissions to the cartridge according to the determined access contexts and the locked files manifest.

20 Claims, 6 Drawing Sheets

(51) Int. Cl.
    *G06F 11/34* (2006.01)
    *G06F 9/54* (2006.01)
    *H04L 12/24* (2006.01)
    *G06F 9/455* (2006.01)
    *H04L 29/06* (2006.01)

(52) U.S. Cl.
    CPC .... *G06F 11/3409* (2013.01); *G06F 17/30082* (2013.01); *G06F 17/30174* (2013.01); *G06F 17/30194* (2013.01); *G06F 17/30309* (2013.01); *G06F 17/30356* (2013.01); *H04L 41/082* (2013.01); *H04L 67/06* (2013.01); *H04L 67/34* (2013.01); *G06F 2009/45595* (2013.01); *G06F 2209/544* (2013.01); *H04L 63/08* (2013.01)

(58) Field of Classification Search
    CPC ........... G06F 17/30356; G06F 11/3408; G06F 9/45558; G06F 2009/45595; G06F 9/541; H04L 41/082; H04L 67/06; H04L 67/34; H04L 63/08
    See application file for complete search history.

(56) References Cited

U.S. PATENT DOCUMENTS

| | | |
|---|---|---|
| 9,189,224 B2 | 11/2015 | Ravi |
| 2005/0120025 A1* | 6/2005 | Rodriguez ........ G06F 17/30073 |
| 2007/0156670 A1* | 7/2007 | Lim .................... G06F 21/6218 |
| 2010/0036889 A1* | 2/2010 | Joshi ................ G06F 17/30194 |
| | | 707/821 |
| 2010/0287529 A1 | 11/2010 | Costa et al. |
| 2011/0184993 A1* | 7/2011 | Chawla .............. G06F 9/45533 |
| | | 707/802 |
| 2011/0185014 A1 | 7/2011 | Eccles |
| 2011/0295984 A1* | 12/2011 | Kunze ....................... G06F 8/62 |
| | | 709/220 |
| 2012/0066670 A1* | 3/2012 | McCarthy ........... H04L 41/0806 |
| | | 717/169 |
| 2012/0185821 A1* | 7/2012 | Yaseen ...................... G06F 8/10 |
| | | 717/105 |
| 2012/0303807 A1* | 11/2012 | Akelbein ............ G06F 11/3006 |
| | | 709/224 |
| 2012/0324069 A1* | 12/2012 | Nori ...................... G06F 9/5066 |
| | | 709/222 |
| 2013/0138810 A1* | 5/2013 | Binyamin ............... H04L 41/50 |
| | | 709/225 |
| 2013/0185706 A1 | 7/2013 | Dominick |
| 2013/0227561 A1* | 8/2013 | Walsh ..................... G06F 9/455 |
| | | 718/1 |
| 2013/0227563 A1 | 8/2013 | McGrath |
| 2013/0297672 A1 | 11/2013 | McGrath |
| 2013/0297685 A1 | 11/2013 | McGrath |
| 2013/0298183 A1 | 11/2013 | McGrath |
| 2013/0326507 A1 | 12/2013 | McGrath |
| 2013/0346945 A1 | 12/2013 | Yousouf |
| 2014/0075426 A1 | 3/2014 | West |
| 2014/0075432 A1 | 3/2014 | McGrath et al. |
| 2014/0149485 A1* | 5/2014 | Sharma ................. H04L 67/142 |
| | | 709/202 |
| 2014/0156519 A1 | 6/2014 | Thompson |
| 2014/0173554 A1 | 6/2014 | Gupta |
| 2014/0196044 A1 | 7/2014 | Fernando |
| 2014/0289391 A1 | 9/2014 | Balaji et al. |
| 2015/0020061 A1 | 1/2015 | Ravi |
| 2015/0160977 A1 | 6/2015 | Accapadia et al. |
| 2015/0178065 A1 | 6/2015 | Valkov |
| 2015/0193481 A1 | 7/2015 | McGrath et al. |
| 2015/0195337 A1 | 7/2015 | McGrath et al. |
| 2015/0242199 A1 | 8/2015 | Goldstein et al. |

OTHER PUBLICATIONS

USPTO, Office Action for U.S. Appl. No. 14/187,764, mailed Jul. 17, 2015.
USPTO, Final Office Action for U.S. Appl. No. 14/187,764, mailed Jan. 21, 2016.
USPTO, Office Action for U.S. Appl. No. 14/187,764, mailed Jun. 14, 2016.
USPTO, Office Action for U.S. Appl. No. 14/187,826, mailed May 2, 2016.
USPTO, Final Office Action for U.S. Appl. No. 14/187,764, mailed Feb. 9, 2017.
USPTO, Final Office Action for U.S. Appl. No. 14/187,826, mailed Dec. 1, 2016.

* cited by examiner

400 

Identify operation to perform with respect to a cartridge on a multi-tenant PaaS system
410

Determine access contexts for the operation
420

Access locked files manifest associated with the cartridge
430

Apply access permissions to the cartridge and the cartridge files/directories of the locked files manifest according to the determined access contexts for the operation
440

*Figure 4*

LOCKED FILES FOR CARTRIDGES IN A MULTI-TENANT PLATFORM-AS-A-SERVICE (PAAS) SYSTEM

RELATED APPLICATION

This application claims the benefit under 35 U.S.C. §119 (e) of U.S. Patent Provisional Application No. 61/925,381, filed on Jan. 9, 2014, the entirety of which is incorporated herein by reference.

TECHNICAL FIELD

The implementations of the disclosure relate generally to computing infrastructures and, more specifically, relate to locked files for cartridges in a multi-tenant Platform-as-a-Service (PaaS) system.

BACKGROUND

Currently, a variety of Platform-as-a-Service (PaaS) offerings exist that include software and/or hardware facilities for facilitating the execution of web applications. In some cases, these PaaS offerings utilize a cloud computing environment (the "cloud") to support execution of the web applications. Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware, software, and provisioning hosting capabilities, providing the facilities to support the complete life cycle of building, delivering, and servicing web applications that are entirely available from the Internet. Typically, these facilities operate as one or more virtual machines (VMs) running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 4 is a flow diagram illustrating a method for applying access permissions for locked files of a cartridge in a multi-tenant PaaS system according to an implementation of the disclosure.

DETAILED DESCRIPTION

Implementations of the disclosure provide locked files for cartridges in a multi-tenant Platform-as-a-Service (PaaS) system. In one implementation, a cartridge of the PaaS system may be written by a cartridge author and utilized in deployed applications by application developers. A cartridge may include software or firmware that provides functionality to execute the application on the multi-tenant PaaS system, the functionality including configuration templates, scripts, dependencies, and feature to add to the application. The PaaS system may include a locked files security component to manage access permissions to "locked files" of the cartridge. The locked files may include cartridge files and/or directories indicated as protected by the cartridge author. While creating the cartridge, the cartridge author may identify the locked files of the cartridge that the application developer may not modify. The access permissions are applied to instances of the cartridge run on the PaaS by deployed applications.

When the cartridge is accessed, the locked files security component may determine a context of the access (e.g., component/user accessing the cartridge). The access context may include the PaaS system (i.e., broker), the cartridge author, or the application developer. The locked files security component can determine the access context and, based on this determination, enforce access to the locked files (e.g., PaaS system has access to all files; cartridge author may read and modify files depending on operation; application developer may have restricted access (read only) at discretion of cartridge author via a locked files manifest).

Previous implementations of PaaS systems did not provide for user-level permission to access and edit cartridges. Cartridges in previously implementations of PaaS system ran at a highest level of security, creating inefficiencies and inflexibilities in the PaaS system. Implementations of the disclosure allow different users, such as application developers, to be able to read and write to files of a cartridge, while also allowing the cartridge author to identify critical files and directories of the cartridge that should remain protected. Implementations of the disclosure prevent application developers from inadvertently breaking an application by modifying files of the cartridge that are reserved for use by the cartridge author.

Figure 1:
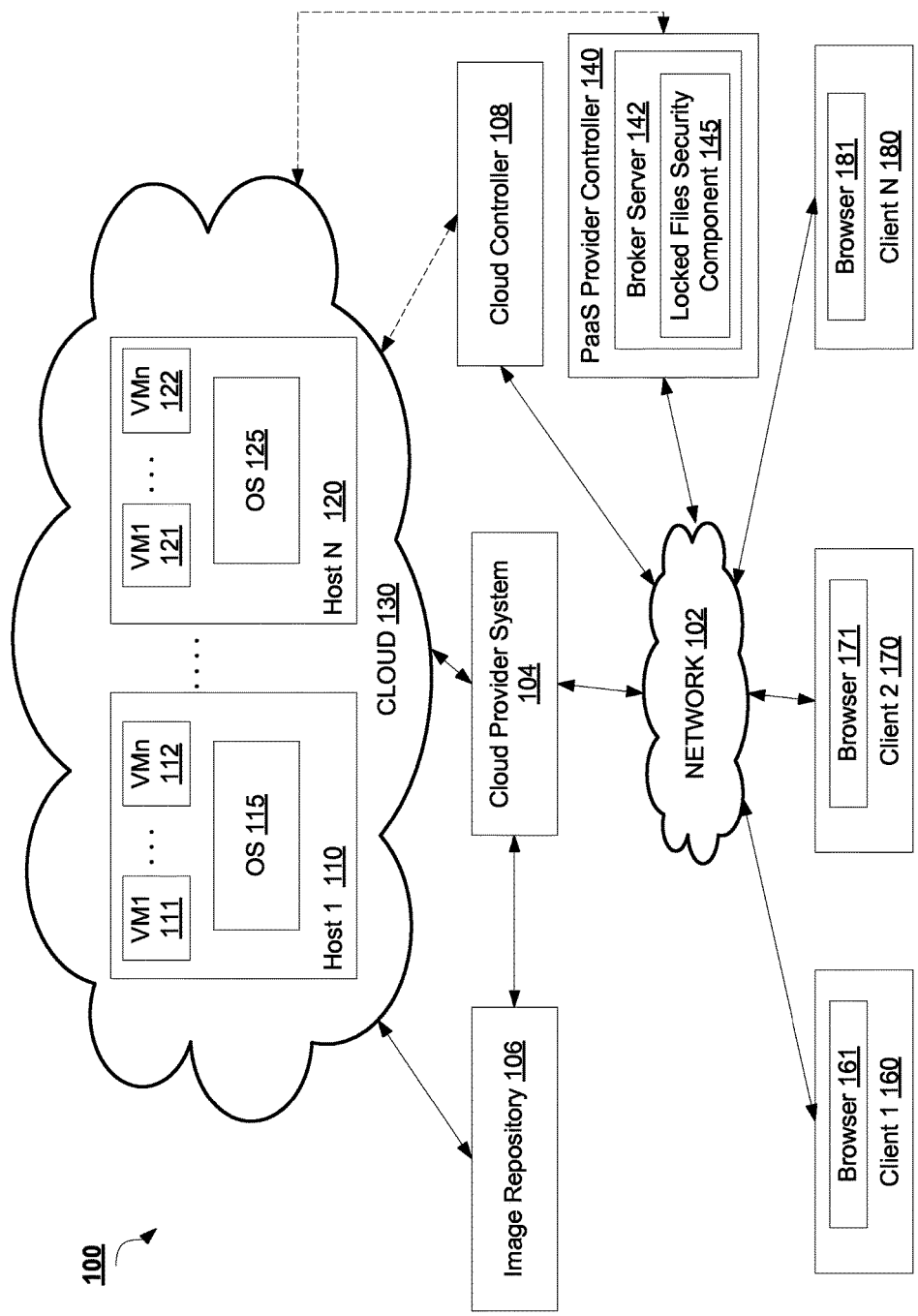
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes to execute software and/or other processes. In some implementations, these nodes are virtual machines (VMs), such as VMs 111, 112, 121, and 122 hosted in cloud 130. Each VM 111, 112, 121, 122 is hosted on a physical machine, such as host 1 110 through host N 120, configured as part of the cloud 130. The VMs 111, 112, 121, 122 may be executed by OSes 115, 125 on each host machine 110, 120.

In some implementations, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181. In other implementations, the applications may be hosted directly on hosts 1 through N 110-120 without the use of VMs (e.g., a "bare metal" implementation), and in such an implementation, the hosts themselves are referred to as "nodes".

Clients 160, 170 and 180 are connected to hosts 110, 120 on cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS provider controller 140. Based on these commands, the cloud controller 108 provides data (e.g., such as pre-generated images) associated with different applications to the cloud provider system 104. In some implementations, the data may be provided to the cloud provider 104 and stored in an image repository 106, or in an image repository (not shown) located on each host 110, 120, or in an image repository (not shown) located on each VM 111, 112, 121, 122. This data is used for the execution of applications for a multi-tenant PaaS system managed by the PaaS provider controller 140.

In one implementation, a cartridge of the PaaS system may be written by a cartridge author and utilized in deployed applications by application developers. The PaaS provider controller 140 may include a broker server 142 with a locked files security component 145 to manage access permissions to "locked files" of the cartridge. The locked files may include cartridge files and/or directories indicated as protected by the cartridge author. While creating the cartridge, the cartridge author may identify the locked files of the cartridge that the application developer may not modify. The access permissions are applied to instances of the cartridge run on the PaaS by deployed applications.

When the cartridge is accessed, the locked files security component 145 may determine a context of the access (e.g., component/user accessing the cartridge). The access context may include the PaaS system (i.e., broker), the cartridge author, or the application developer. The locked files security component 145 can determine the access context and, based on this determination, enforce access to the locked files (e.g., PaaS system has access to all files; cartridge author may read and modify files depending on operation; application developer may have restricted access (read only) at discretion of cartridge author via a locked files manifest). Further details of providing locked files for cartridges in a multi-tenant PaaS system are described below with respect to FIG. 2.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
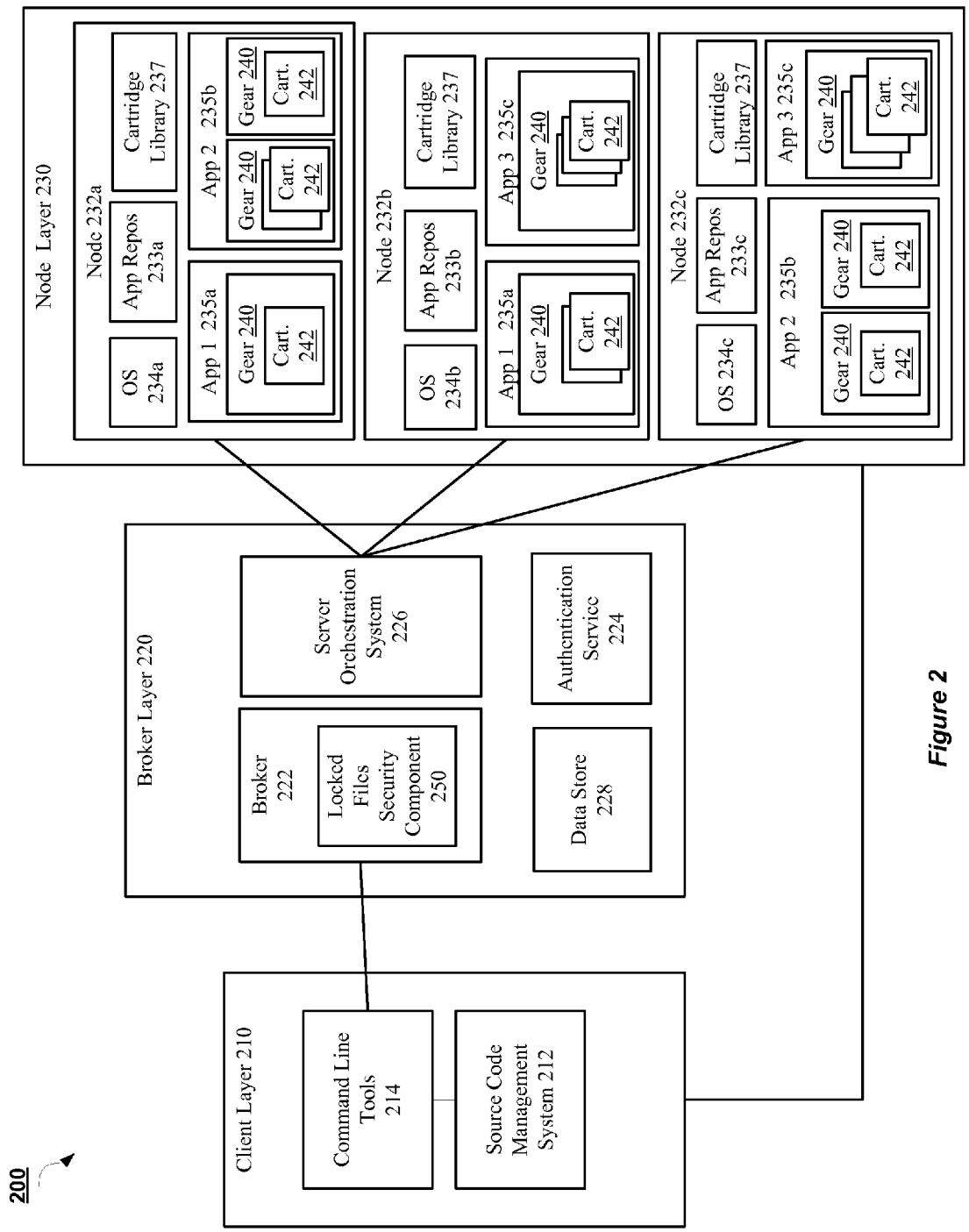
FIG. 2 is a block diagram of a Platform-as-a-Service (PaaS) system architecture according to an implementation of the disclosure.

FIG. 2 is a block diagram of a PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a broker layer 220, and a node layer 230.

In one implementation, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes for each application associated with the end user of the PaaS system 200. The packaged software application can then be "pushed" from the local SCM repository to a remote SCM repository, such as app repos 233*a*, 233*b*, 233*c*, at the node(s) 232*a*, 232*b*, 232*c* running the associated application. From the remote SCM repository 233*a*, 233*b*, 233*c*, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 make use of an application programming interface ("API") of the broker layer 220 and perform other applications management tasks in an automated fashion using other interfaces, as will be described in more detail further below in accordance with some implementations.

In one implementation, the broker layer 220 acts as middleware between the client layer 210 and the node layer 230. The node layer 230 includes the nodes 232*a-c* on which software applications 235*a-c* are provisioned and executed. In one implementation, each node 232*a-c* is a VM provisioned by an Infrastructure-as-a-Service (IaaS) provider. In other implementations, the nodes 232a-c may be physical machines (e.g., bare metal) or VMs residing on a single physical machine and running gears (discussed below) that provide functionality of applications of a multi-tenant PaaS system. In one implementation, the broker layer 220 is implemented on one or more machines, such as server computers, desktop computers, etc. In some implementations, the broker layer 220 may be implemented on one or more machines separate from machines implementing each of the client layer 210 and the node layer 230, or may implemented together with the client layer 210 and/or the node layer 230 on one or more machines, or some combination of the above.

In one implementation, the broker layer 220 includes a broker 222 that coordinates requests from the client layer 210 with actions to be performed at the node layer 230. One such request is new application creation. In one implementation, when a user, using the command line tools 214 at client layer 210, requests the creation of a new application 235a-c, or some other action to manage the application 235a-c, the broker 222 first authenticates the user using an authentication service 224. In one implementation, the authentication service may comprise custom authentication methods, or standard protocols such as SAML, OAuth, etc. Once the user has been authenticated and allowed access to the system by authentication service 224, the broker 222 uses a server orchestration system 226 to collect information and configuration information about the nodes 232a-c.

In one implementation, the broker 222 uses the Marionette Collective™ ("MCollective™") framework available from Puppet Labs™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the broker 222 manages the business logic and model representing the nodes 232a-c and the applications 235a-c residing on the nodes, and acts as a controller that generates the actions requested by users via an API of the client command line tools 214. The server orchestration system 226 then takes the actions generated by the broker 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud based storage service provided by a Storage-as-a-Service (SaaS) provider, such as Amazon™ S3™ (Simple Storage Service). The broker 222 uses the information about the nodes 232a-c and their applications 235a-c to model the application hosting service and to maintain records about the nodes. In one implementation, data of a node 232a-c is stored in the form of a JavaScript Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some implementations, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software (or middleware) providing the functionality, such as configuration templates, scripts, and/or dependencies, to run an application 235a-c and/or add a feature to an application, 235a-c. In one implementation, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance 242 of a cartridge from cartridge library 237 to an application 235a-c provides a capability for the application 235a-c, without the customer who owns the application having to administer or update the included capability.

In one implementation, each node 232a-c is implemented as a VM and has an operating system 234a-c that can execute applications 235a-c using the app repos 233a-c and cartridge libraries 237 that are resident on the nodes 232a-c. Each node 302a-b also includes a server orchestration system agent (not shown) configured to track and collect information about the node 232a-c and to perform management actions on the node 232a-c. Thus, in one implementation, using MCollective™ as the server orchestration system 226, the server orchestration system agent (not shown) at the node 232a-c can act as a MCollective™ server. The server orchestration system 226 would then act as the MCollective™ client that can send requests, queries, and commands to the MCollective™ server agent on node 232a-c.

As previously mentioned, cartridges provide the underlying support software that implements the functionality of applications 235a-c. In one implementation, an application 235a-c may utilize one or more cartridge instances 242 that are run in one or more resource-constrained gears 240 on nodes 232a-c. Cartridge library 237 provides an OS-based location, outside of all application gears 240, that acts as a source for cartridge instantiations 242 that provide functionality for an application 235a-c.

An application 235a-c may use more than one cartridge instance 240 as part of providing functionality for the application 235a-b. One example of this is a JavaEE application that uses a JBoss™ AS7 cartridge with a supporting MySQL™ database provided by a MySQL™ cartridge. Each cartridge instance 242 may include a software repository that provides the particular functionality of the cartridge instance 242.

As mentioned above, a gear 240 is a resource-constrained process space on the node 232a-c to execute functionality of an application 235a-c. In some implementations, a gear 240 is established by the node 232a-c with resource boundaries, including a limit and/or designation of the amount of memory, amount of storage, and security types and/or labels to be applied to any functions executed by the gear 240. In one implementation, gears 240 may be established using the Linux Containers (LXC) virtualization method. In further implementations, gears 240 may also be established using cgroups, SELinux™, and kernel namespaces, to name a few examples. As illustrated in FIG. 2, cartridges instances 242 for an application 235a-c may execute in gears 240 dispersed over more than one node 232a-b. In other implementations, cartridge instances 242 for an application 235a-c may run in one or more gears 240 on the same node 232a-c.

Implementations of the disclosure provide utilization of locked files in a cartridge instance 242 by the multi-tenant PaaS. In one implementation, broker layer 220 includes a locked files security component 250 to provide support for the locked files in cartridge instances 242 of the multi-tenant PaaS 200. In one implementation, locked files security component 250 is part of broker 222. The locked files security component 250 may be the same as locked files security component 145 described with respect to FIG. 1. Further details of the interaction between locked files security component 250 and the cartridges 242 implementing the locked files are described below with respect to FIG. 3.

Figure 3:
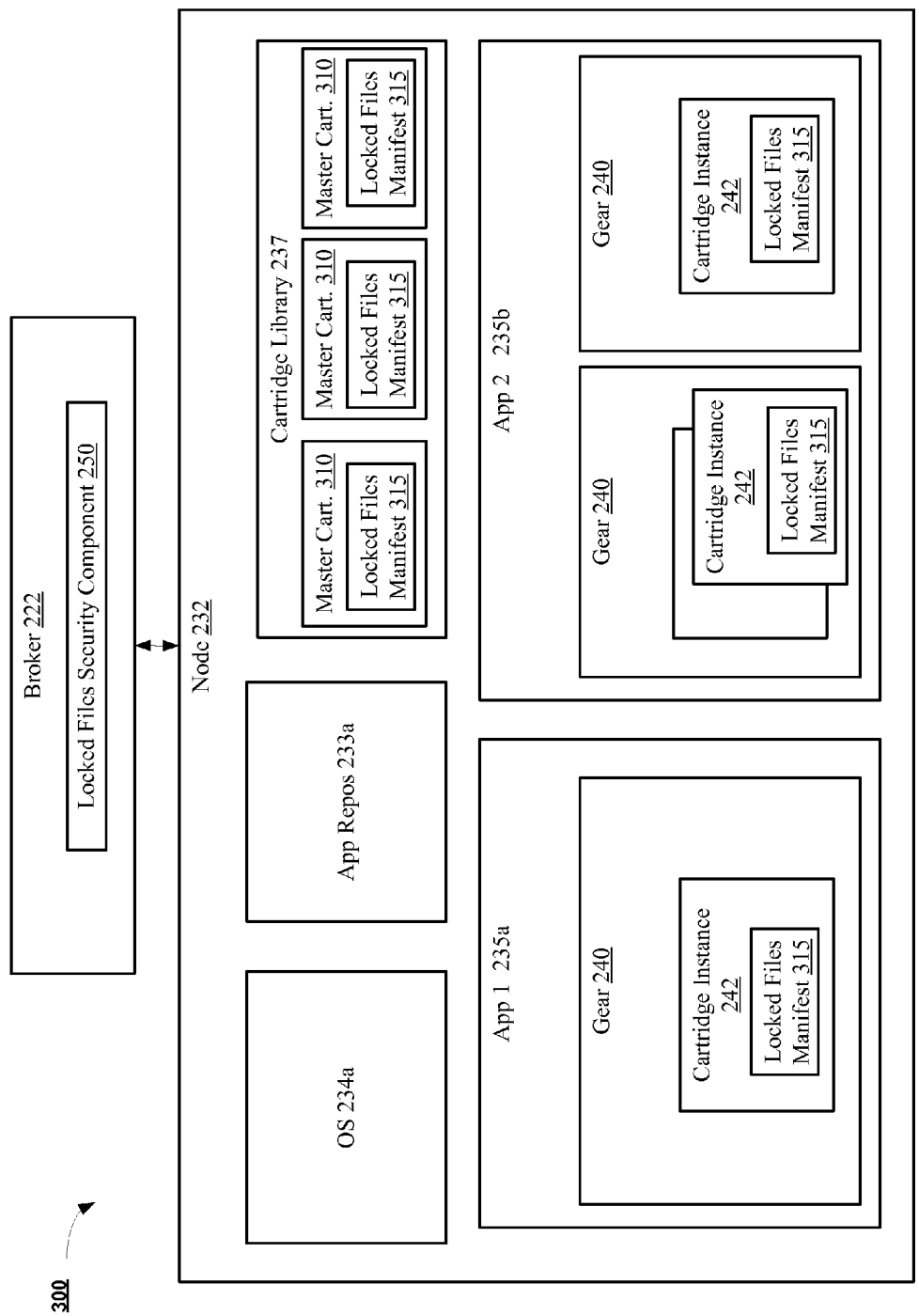
FIG. 3 is a block diagram of a communication architecture of a multi-tenant PaaS for providing locked files for cartridges in the multi-tenant PaaS system according to an implementation of the disclosure.

FIG. 3 is a block diagram illustrating a communication architecture 300 of a multi-tenant PaaS for implementing locked files for cartridges. Architecture 300 includes the broker 222 in communication with a node 232. Broker 222 and node 232, and their subcomponents, may be the same as their counterparts described with respect to FIG. 2. Broker 222 may include locked files security component 250 as described with respect to FIG. 2. The broker 222 utilizes its locked files security component 250 to assist in managing access permissions to "locked files" of the cartridge. In one implementation, a cartridge author may create a cartridge 310 ("master cartridge") to be deployed by application developers in applications 235a, 235b as cartridge instances 242.

As part of the master cartridge 310, the cartridge author may indicate files and/or directories to be protected in a locked files manifest 315 of the cartridge 310. The locked files manifest 315 may be file that lists the files and/or directories of the cartridge 310 that the cartridge author wants to restrict access to by application developers and others that utilize the cartridge 310 in the PaaS system. In one embodiment, the locked files manifest 315 is an YML file type. When a file is listed in the locked files manifest 315, the application developer may, depending on the access context, access the file but may not modify the file. When a directory is listed in the locked files manifest 315, an application developer may, depending on the access context, edit the files within the directory but may not add or delete files to/from the directory. In one implementation, when the locked files manifest 315 is empty, the cartridge is considered unlocked for purposes of application developer access to cartridge files and directories. When the cartridge 310 is utilized by deployed applications as a cartridge instance 242, the locked files manifest 315 associated with the cartridge 310 is part of the cartridge instance 242.

During a lifecycle of a cartridge instance 242, the locked files security component 250 of broker 222 uses the locked files manifest 315 to dynamically change access permissions to the indicated locked files based on an access context to the cartridge. The access context may refer to the component and/or user that are interacting with the cartridge. In one implementation, the access context may include the PaaS system (i.e., broker), the cartridge author, or the application developer.

The locked files security component 250 may determine the access context by referring to stored information that correlates a particular interaction with a type of user or component. For example, the locked files security component 250 may maintain a list of PaaS system actions and the associated permissions (locked vs. unlocked) to apply to the users during each action. Based on this determination of the access context, the locked files security component 250 may enforce access to the locked files. For example, the PaaS system has access to all files at all times, the cartridge author may read and modify files depending on the operation being performed, and the application developer may have restricted access (read only) at discretion of cartridge author via the locked files manifest.

For example, for the operation of creating or deleting a gear 240, the PaaS platform is running in a root context and can access all files. In this case, neither the cartridge author nor the application developer can influence this step. As such, the cartridge author and application developer have no access permissions at this time.

For the operation of setting up a cartridge instance 242, the PaaS system initiates the setup routine while operating in a root context and, as such, has access to all files. In this context, the cartridge author is granted access to the gear 240 and the cartridge instance's 242 home directory, while the application developer has no access.

For the operation of starting or stopping a cartridge or building an application, the PaaS system initiates the start cartridge while running as gear. The cartridge author is then granted access to any files of the locked files manifest 315 (cartridge unlocked). Similarly, the application developer is also granted access to the cartridge files, with restricted access to those files listed in the locked files manifest 315 (cartridge unlocked).

For the operation of tearing down a cartridge, the PaaS system initiates the teardown running in a root context and can access all files. The cartridge author is granted access to the gear 240 and the cartridge instance's 242 home directory, while the application developer has no access.

FIG. 4 is a flow diagram illustrating a method 400 for applying access permissions for locked files of a cartridge in a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by broker layer 220 described with respect to FIG. 2.

Method 400 begins at block 410, where an operation is identified to perform with respect to a cartridge on a multi-tenant PaaS system. In one implementation, the operation may be one that utilizes a broker layer of the PaaS system, such as a create/delete gear operation, a setup cartridge operation, a start/stop cartridge operation, a build application operation, or a teardown cartridge operation. At block 420, access contexts for the identified operation are determined. In one implementation, the access context refers to the user or component that is trying to access a given file for a given operation. In a PaaS system, there may be at least three access contexts including, but not limited to, the PaaS system (e.g., broker) accessing a cartridge file as part of an operation, the cartridge author accessing a cartridge file as part of an operation, or the application developer accessing a cartridge file as part of an operation.

Then, at block 430, a locked files manifest associated with the cartridge is accessed. In one implementation, the locked files manifest is part of the cartridge and is populated with entries by the cartridge author. The locked files manifest may be file that lists the files and/or directories of the cartridge that the cartridge author wants to restrict access to by application developers and others that utilize the cartridge in the PaaS system. When a file is listed in the locked files manifest, the application developer may, depending on the access context, access the file but may not modify the file. When a directory is listed in the locked files manifest, an application developer may, depending on the access context, edit the files within the directory but may not add or delete files to/from the directory. In one implementation, when the locked files manifest is empty, the cartridge is considered unlocked for purposes of application developer access to cartridge files and directories. When the cartridge is utilized by deployed applications as a cartridge instance, the locked files manifest associated with the cartridge is part of the cartridge instance.

Lastly, at block 440, access permissions are applied to the cartridge and the cartridge files/directories of the locked files manifest according to the determined access contexts for the operation. Method 500 of FIG. 5 below provides additional details of applying access permissions based on access context.

Figure 5:
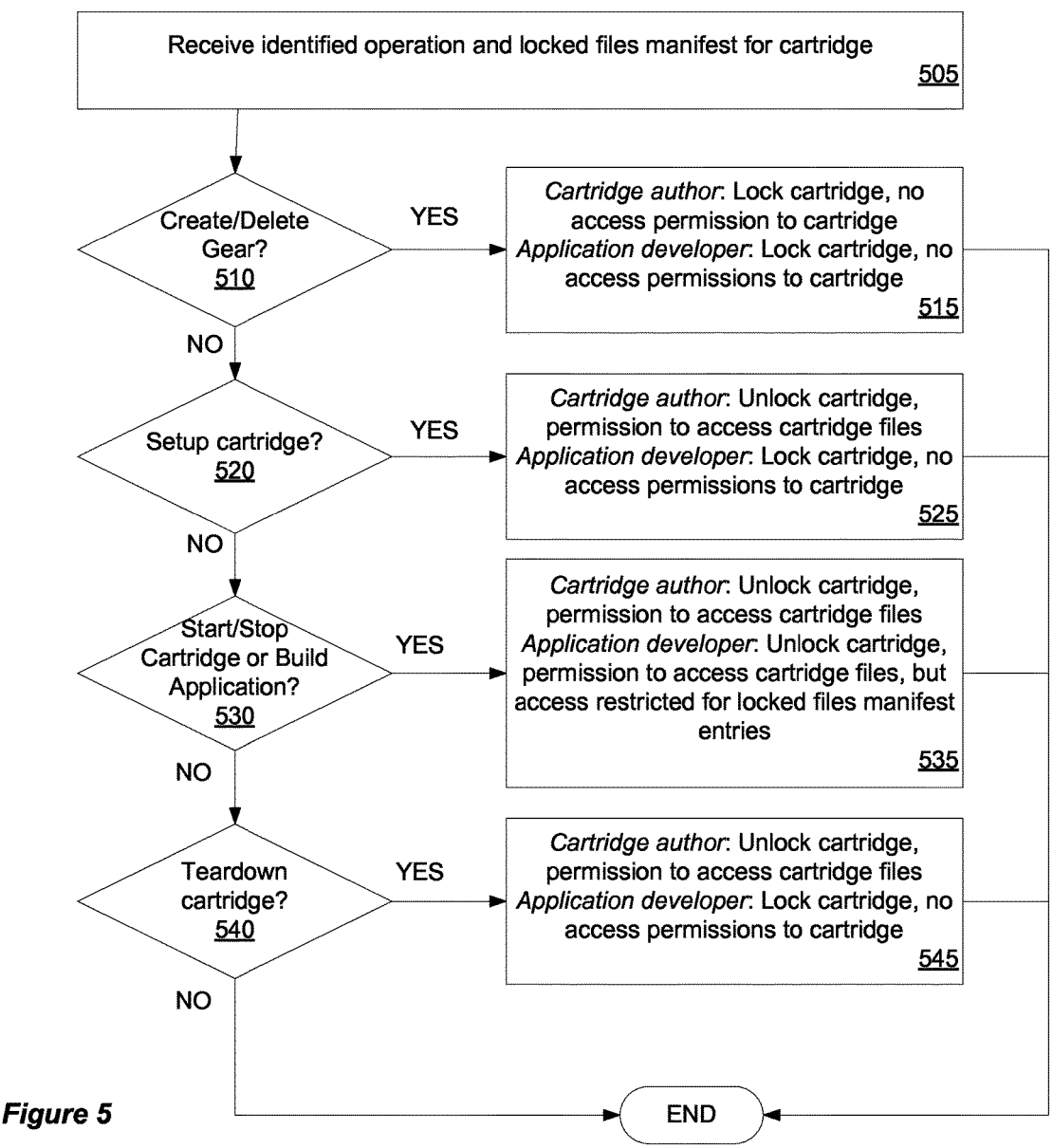
FIG. 5 is a flow diagram illustrating a method for applying access permissions to cartridge files based on an access context in a multi-tenant PaaS system according to an implementation of the disclosure.

FIG. 5 is a flow diagram illustrating a method 500 for applying access permissions to cartridge files based on an access context in a multi-tenant PaaS system according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by locked files security component 250 described with respect to FIG. 2.

Method 500 begins at block 505, where an identified operation and locked files manifest for a cartridge are received. In one implementations, the operation and locked files manifest are identified per method 400 described with respect to FIG. 4. At decision block 510 it is determined whether the operation is a create gear or delete gear operation. If so, then method 500 proceeds to block 515 where the cartridge is locked for both of the cartridge author and the application developer. This means that the cartridge author and the application developer do not have access permissions to the cartridge of its contents during the create gear or delete gear operations. The create gear and delete gear operations are run in the root context by the PaaS platform, so neither the cartridge author nor the application developer should be able to influence this operation.

If the operation is not a create gear or delete gear operation, then method 500 proceeds to decision block 520, where it is determined whether the operation is a setup cartridge operation. If so, then method 500 proceeds to block 525 where the cartridge is unlocked for the cartridge author and, as such, the cartridge author is granted access permission to the gear hosting the cartridge and the files and directories of the cartridge. However, the cartridge remains locked for the application developer and, as such, the application developer does not have access permissions to the cartridge.

If the operation is not a setup cartridge operation at decision block 520, then method 500 proceeds to decision block 530. At decision block 530 it is determined whether the operation is a start or stop cartridge operation or a build application operation. If so, then method 500 proceeds to block 535 where the cartridge is unlocked for the cartridge author and, as such, the cartridge author is granted access permission to the gear hosting the cartridge and the files and directories of the cartridge. In addition, the cartridge is also unlocked for the application developer. However, the application developer is granted restricted access to the cartridge files and directories per the locked files manifest of the cartridge. This means that the application developer is provided read-only access to those files that are included in the locked files manifest of the cartridge and restricted access to directories (modify files, but cannot add or delete files from the directory) included in the locked files manifest of the cartridge.

If the operation is not a start or stop cartridge operation or a build application operation at decision block 530, then method 500 proceeds to decision block 540. At decision block 540 it is determined whether the operation is a teardown cartridge operation. If so, then method 500 proceeds to block 545 where the cartridge is unlocked for the cartridge author and, as such, the cartridge author is granted access permission to the gear hosting the cartridge and the files and directories of the cartridge. However, the cartridge remains locked for the application developer and, as such, the application developer does not have access permissions to the cartridge. Note that for all operations performed in the PaaS, the PaaS system (e.g., broker) has access to all files at all times.

Figure 6:
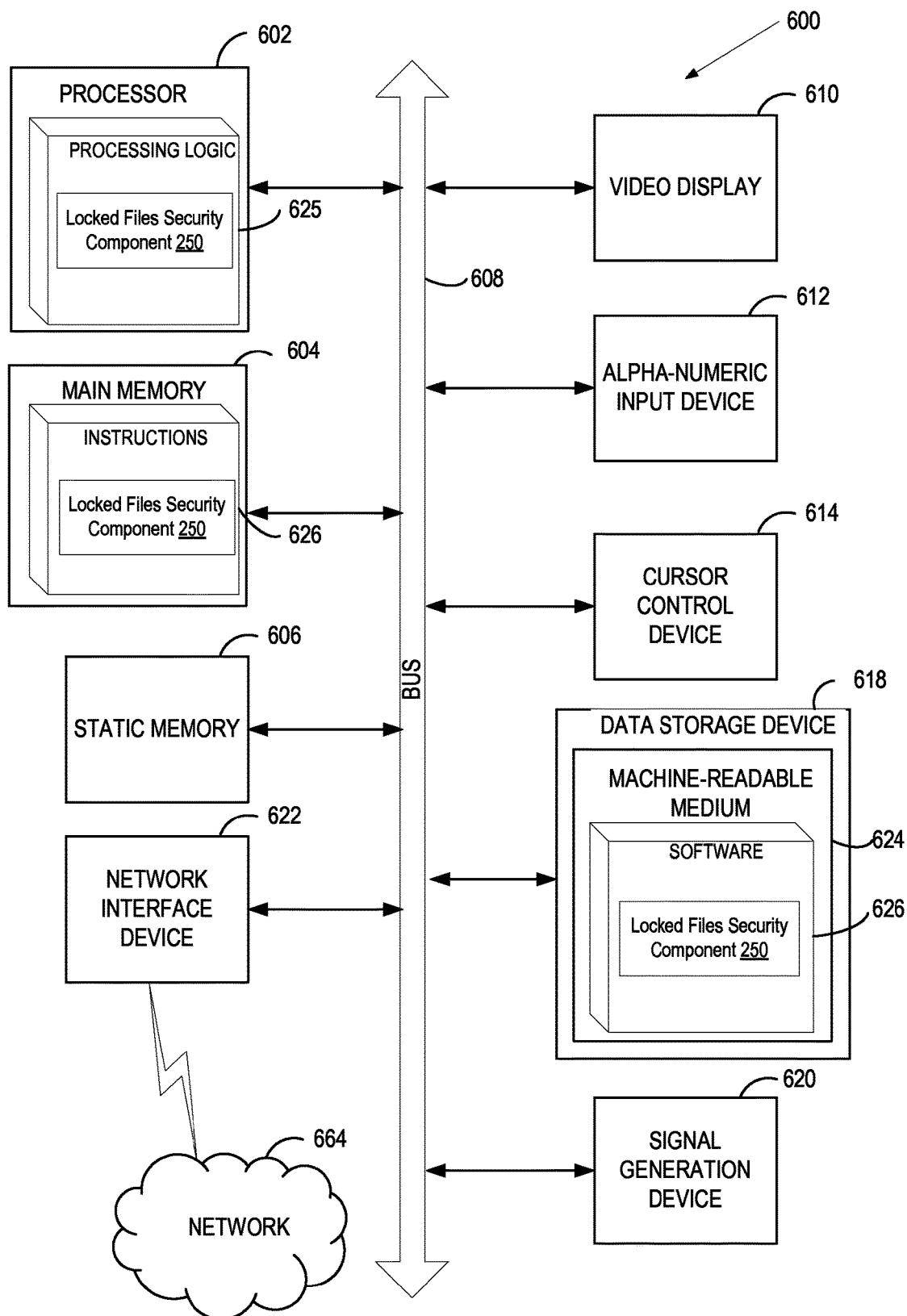
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602 (e.g., processor, CPU, etc.), a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement a locked files security component 250 to implement locked files for cartridges in a multi-tenant PaaS, such as locked files security component 250 described with respect to FIG. 2, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", "translating", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   identifying an operation requested to be performed by a multi-tenant platform-as-a-Service (PaaS) system, wherein the multi-tenant PaaS system comprises nodes to execute applications owned by a plurality of users, wherein functionality of the applications is provided by instances of cartridges deployed on the nodes, and wherein the cartridges each comprise at least one of configuration templates, scripts, or dependencies that are used to execute at least one of the applications on at least one of the nodes of the multi-tenant PaaS system, and wherein the operations comprise at least one of a gear operation, a cartridge operation, or an application operation;

identifying an instance of a cartridge of the cartridges, the identified instance of the cartridge associated with the identified operation;

determining, by a processing device of the multi-tenant PaaS system, access contexts for the operation with respect to the identified instance of the cartridge, the access contexts comprising a user or component that is attempting to access a file of the instance of the cartridge for the identified operation, wherein the user comprises at least one of a cartridge author of the cartridge or an application developer of one of the applications utilizing the cartridge, and wherein the component comprises a broker component of the multi-tenant PaaS system;

referencing, by the processing device, a locked files manifest of the cartridge with the determined access contexts, the locked files manifest identifying:

restricted content items comprising at least one of files or directories of the cartridge to which the cartridge author of the cartridge restricts user-level access to the restricted content; and the access contexts, for each restricted content item, that are prohibited from accessing the restricted content; and applying access permissions to the instance of the cartridge according to the determined access contexts and the locked files manifest.

2. The method of claim 1, wherein the cartridge further comprises one or more features to add to the application.

3. The method of claim 1, wherein the applying the access permissions further comprises:

allowing the cartridge author access to the files and directories of the cartridge; and allowing an application developer restricted access to the files and directories identified in the locked files manifest, wherein the application developer utilizes the cartridge to execute the application on the multi-tenant PaaS system.

4. The method of claim 3, wherein the restricted access comprises read-only access to the files identified in the locked files manifest, and a prohibition on adding or deleting files from the directories identified in the locked files manifest.

5. The method of claim 1, wherein the applying the access permissions further comprises, responsive to the gear operation being at least one of the create gear or the delete gear operation, prohibiting the cartridge author and the application developer from accessing the cartridge.

6. The method of claim 1, wherein the applying the access permissions further comprises, responsive to the cartridge operation being at least one of the setup cartridge operation or the teardown cartridge operation:

granting the cartridge author access to the cartridge; and prohibiting the application developer from accessing the cartridge.

7. The method of claim 1, wherein the applying the access permissions further comprises, responsive to the cartridge operation being at least one of a start cartridge operation or a stop cartridge operation, or the application operation is a build application operation:

granting the cartridge author access to the cartridge; and granting the application developer restricted access to the cartridge, the restricted access comprising read-only access to the files identified in the locked files manifest, and a prohibition on adding or deleting files from the directories identified in the locked files manifest.

8. A system, comprising:

a memory; and a processing device communicably coupled to the memory, the processing device to:

identify an operation requested to be performed by a multi-tenant platform-as-a-Service (PaaS) system, wherein the multi-tenant PaaS system comprises nodes to execute applications owned by a plurality of users, wherein functionality of the applications is provided by instances of cartridges deployed on the nodes, and wherein the cartridges each comprise at least one of configuration templates, scripts, or dependencies that are used to execute at least one of the applications on at least one of the nodes of the multi-tenant PaaS system, and wherein the operations comprise at least one of a gear operation, a cartridge operation, or an application operation;

identify an instance of a cartridge of the cartridges, the identified instance of the cartridge associated with the identified operation;

determine access contexts for the operation with respect to the identified instance of the cartridge, the access contexts comprising a user or component that is attempting to access a file of the instance of the cartridge for the identified operation, wherein the user comprises at least one of a cartridge author of the cartridge or an application developer of one of the applications utilizing the cartridge, and wherein the component comprises a broker component of the multi-tenant PaaS system;

reference a locked files manifest of the cartridge with the determined access contexts, the locked files manifest identifying:

restricted content items comprising at least one of files or directories of the cartridge to which the cartridge author of the cartridge restricts user-level access to the restricted content; and the access contexts, for each restricted content item, that are prohibited from accessing the restricted content; and apply access permissions to the instance of the cartridge according to the determined access contexts and the locked files manifest.

9. The system of claim 8, wherein the cartridge further comprises one or more features to add to the application.

10. The system of claim 8, wherein the processing device to apply the access permissions further comprises the processing device to:

allow the cartridge author access to the files and directories of the cartridge; and allow an application developer restricted access to the files and directories identified in the locked files manifest, wherein the application developer utilizes the cartridge to execute the application on the multi-tenant PaaS system;

wherein the restricted access comprises read-only access to the files identified in the locked files manifest, and a prohibition on adding or deleting files from the directories identified in the locked files manifest.

11. The system of claim 8, wherein the processing device to apply the access permissions further comprises the processing device to, responsive to the gear operation being at least one of a create gear or a delete gear operation, prohibit the cartridge author and the application developer from accessing the cartridge.

12. The system of claim 8, wherein the processing device to apply the access permissions further comprises the processing device to, responsive to the cartridge operation being at least one of setup cartridge operation or a teardown cartridge operation:
grant the cartridge author access to the cartridge; and
prohibit the application developer from accessing the cartridge.

13. The system of claim 8, wherein the processing device to apply the access permissions further comprises the processing device to, responsive to the cartridge operation being at least one of a start cartridge operation, or a stop cartridge operation, or the application operation is a build application operation:
grant the cartridge author access to the cartridge; and
grant the application developer restricted access to the cartridge, the restricted access comprising read-only access to the files identified in the locked files manifest, and a prohibition on adding or deleting files from the directories identified in the locked files manifest.

14. A non-transitory machine-readable storage medium including instructions that, when accessed by a processing device, cause the processing device to:
identify, by the processing device of a multi-tenant Platform-as-a-Service (PaaS) system, an operation requested to be performed by the multi-tenant PaaS system, wherein the multi-tenant PaaS system comprises nodes to execute applications owned by a plurality of users, wherein functionality of the applications is provided by instances of cartridges deployed on the nodes, and wherein the cartridges each comprise at least one of configuration templates, scripts, or dependencies that are used to execute at least one of the applications on at least one of the nodes of the multi-tenant PaaS system, and wherein the operations comprise at least one of a gear operation, a cartridge operation, or an application operation;
identify an instance of a cartridge of the cartridges, the identified instance of the cartridge associated with the identified operation;
determine, by the processing device, access contexts for the operation with respect to the identified instance of the cartridge, the access contexts comprising a user or component that is attempting to access a file of the instance of the cartridge for the identified operation, wherein the user comprises at least one of a cartridge author of the cartridge or an application developer of one of the applications utilizing the cartridge, and wherein the component comprises a broker component of the multi-tenant PaaS system;
reference, by the processing device, a locked files manifest of the cartridge with the determined access contexts, the locked files manifest identifying:
restricted content items comprising at least one of files or directories of the cartridge to which the cartridge author of the cartridge restricts user-level access to the restricted content; and
the access contexts, for each restricted content item, that are prohibited from accessing the restricted content; and
apply, by the processing device, access permissions to the instance of the cartridge according to the determined access contexts and the locked files manifest.

15. The non-transitory machine-readable storage medium of claim 14, wherein the cartridge further comprises one or more features to add to the application.

16. The non-transitory machine-readable storage medium of claim 14, wherein the processing device to apply the access permissions further comprises the processing device to, responsive to the gear operation being at least one of a create gear or a delete gear operation, prohibit the cartridge author and the application developer from accessing the cartridge.

17. The non-transitory machine-readable storage medium of claim 14, wherein the processing device to apply the access permissions further comprises the processing device to, responsive to the cartridge operation being at least one of setup cartridge operation or a teardown cartridge operation:
grant the cartridge author access to the cartridge; and
prohibit the application developer from accessing the cartridge.

18. The non-transitory machine-readable storage medium of claim 14, wherein the processing device to apply the access permissions further comprises the processing device to, responsive to the cartridge operation being at least one of a start cartridge operation, or a stop cartridge operation, or the application operation is a build application operation:
grant the cartridge author access to the cartridge; and
grant the application developer restricted access to the cartridge, the restricted access comprising read-only access to the files identified in the locked files manifest, and a prohibition on adding or deleting files from the directories identified in the locked files manifest.

19. The non-transitory machine-readable storage medium of claim 14, wherein the processing device to apply the access permissions further comprises the processing device to:
allow the cartridge author access to the files and directories of the cartridge; and
allow an application developer restricted access to the files and directories identified in the locked files manifest, wherein the application developer utilizes the cartridge to execute the application on the multi-tenant PaaS system.

20. The non-transitory machine-readable storage medium of claim 19, wherein the restricted access comprises read-only access to the files identified in the locked files manifest, and a prohibition on adding or deleting files from the directories identified in the locked files manifest.

\* \* \* \* \*